(12) United States Patent
Shikida et al.

(10) Patent No.: US 10,819,404 B2
(45) Date of Patent: Oct. 27, 2020

(54) WIRELESS APPARATUS AND WIRELESS COMMUNICATION METHOD

(71) Applicant: NEC Corporation, Minato-ku, Tokyo (JP)

(72) Inventors: Jun Shikida, Tokyo (JP); Naoto Ishii, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/616,681

(22) PCT Filed: May 28, 2018

(86) PCT No.: PCT/JP2018/020260
§ 371 (c)(1),
(2) Date: Nov. 25, 2019

(87) PCT Pub. No.: WO2018/221431
PCT Pub. Date: Dec. 6, 2018

(65) Prior Publication Data
US 2020/0212971 A1  Jul. 2, 2020

(30) Foreign Application Priority Data

Jun. 2, 2017  (JP) .................................. 2017-109674

(51) Int. Cl.
| | | |
|---|---|---|
| *H04B 7/0456* | (2017.01) | |
| *H04L 25/02* | (2006.01) | |
| *H04W 16/28* | (2009.01) | |
| *H04B 17/318* | (2015.01) | |

(52) U.S. Cl.
CPC ......... *H04B 7/0456* (2013.01); *H04B 17/318* (2015.01); *H04L 25/0202* (2013.01); *H04W 16/28* (2013.01)

(58) Field of Classification Search
CPC .... H04B 7/086; H04B 7/0456; H04B 17/318; H04L 25/0202; H04W 16/28
See application file for complete search history.

(56) References Cited

U.S. PATENT DOCUMENTS

| | | | | |
|---|---|---|---|---|
| 2005/0190105 A1* | 9/2005 | Ishizu | ................... | H04B 7/086 342/383 |
| 2005/0259006 A1* | 11/2005 | Kim | ......................... | G01S 3/74 342/377 |

(Continued)

FOREIGN PATENT DOCUMENTS

| | | |
|---|---|---|
| JP | 2007-019806 A | 1/2007 |
| JP | 2013-168751 A | 8/2013 |

(Continued)

OTHER PUBLICATIONS

International Search Report for PCT Application No. PCT/JP2018/020260, dated Aug. 21, 2018.

(Continued)

*Primary Examiner* — Sung S Ahn

(57) ABSTRACT

A wireless apparatus includes a first weight multiplication part, a channel estimation part, a channel response conversion part, and a second weight generation part. The first weight multiplication part includes first weights, each of which corresponds to an individual one of a plurality of beams, and multiplies a signal(s) corresponding to a reference signal(s) transmitted from a wireless terminal(s) by the first weights. The channel estimation part estimates first channel responses for the respective beams by using the signals obtained by the multiplication by the first weights. The channel response conversion part converts the first channel responses into second channel responses by using the first weights. The second weight generation part generates second weights used for wireless communication with the wireless terminal(s) by using the second channel responses.

20 Claims, 11 Drawing Sheets

(56) References Cited

U.S. PATENT DOCUMENTS

2007/0009016 A1    1/2007   Tsutsui
2016/0197709 A1    7/2016   Shen et al.
2017/0311321 A1   10/2017   Kakishima et al.

FOREIGN PATENT DOCUMENTS

JP    2016-134841 A    7/2016
WO    2015/033930 A1   3/2015
WO    2016/047409 A1   3/2016

OTHER PUBLICATIONS

Shohei Yoshioka, et al., "Performance Evaluation of 5G Low-SHF-Band Massive MIMO with Digital Beamforming Using Two-Stage Channel Estimation", IEICE Technical Report, vol. 116, No. 396, RCS2016-238. pp. 13-18, Jan. 2017, Japan.

Xin Xiong, et al., "Beam-Domain Channel Estimation for FDD Massive MIMO Systems with Optimal Thresholds", IEEE Transactions on Wireless Communications, May 10, 2017. vol. 16, Issue. 7, Jul. 2017, pp. 4669-4682.

Hongxiang Xie, et al., "An Overview of Low-Rank Channel Estimation for Massive MIMO Systems", IEEE Access, Nov. 1, 2016, vol. 4, pp. 7313-7321.

Jun Shikida, et al., "Beam Space Channel Estimation Using Multiple DFT Matrices for Massive MIMO Systems",IEICE Technical Report, vol. 117, No. 456, RCS2017-392, pp. 405-410, Feb. 2018, Japan.

* cited by examiner

WIRELESS APPARATUS AND WIRELESS COMMUNICATION METHOD

FIELD

Reference to Related Application

This application is a National Stage Entry of PCT/JP2018/020260 filed on May 28 2018, which claims priority from Japanese Patent Application 2017-109674 filed on Jun. 2, 2017, the contents of all of which are incorporated herein by reference, in their entirety.

The present invention relates to a wireless apparatus and a wireless communication method.

BACKGROUND

Many wireless apparatuses such as base stations and wireless local area network (LAN) access points for recent portable phones include a plurality of antennas to realize high-speed communication. As one of the transmission techniques using a plurality of antennas, there is a technique referred to as beamforming in which the directivity of a plurality of antennas as a whole is controlled by adjusting amplitudes or phases of transmission signals or reception signals of the individual antennas. There are two kinds of beamforming, one is analog beamforming and the other is digital beamforming. In analog beamforming, amplitudes or phases of signals in a radio frequency band are adjusted by using amplifiers or phase shifters. In digital beamforming, amplitudes or phases of signals in a baseband are adjusted by multiplication by weights (namely, weight coefficients). For example, by using digital beamforming, a wireless apparatus such as a base station can realize multi-user multiple-input multiple-output (MIMO) transmission in which signals of a plurality of terminals are spatially multiplexed.

PTL 1 discloses a method for generating weights in a wireless apparatus. Specifically, this literature describes a method for estimating channel responses between a wireless apparatus and a terminal by using a known reference signal transmitted by the terminal and generating weights by using the estimation results. However, according to the method described in PTL 1, if the channel response estimation accuracy is poor, beams suitable for channel states cannot be formed accurately. Thus, the method has a problem in that the gain of the beamforming or the separation performance of spatially multiplexed signals is deteriorated.

NPL 1 describes a weight generation method in which a wireless apparatus forms a plurality of beams by using fixed weights prepared, receives a reference signal from a terminal, and generates weights by using estimated channel responses corresponding to selected beams. In accordance with the technique disclosed in NPL 1, by selecting beams whose reception quality is good, channel responses whose estimation accuracy is good can be used to generate weights.

In addition, NPL 1 describes a transmission method of transmission signals performed when the above weight generation method is used. In accordance with this transmission method, after weights generated from estimated channel values are multiplied by transmission signals, the products are multiplied by fixed weights of selected beams. In this transmission method, since the selected beams are common among spatially multiplexed signals, the separation of the spatially multiplexed signals is realized by using the weights generated from the estimated channel values.

PTL 2 describes a method in which, when a base station performs beamforming transmission, the base station selectively uses fixed weights or adaptive weights depending on the reception quality of a terminal. In addition, PTL 3 describes a method in which a base station compares acquired channel information with the previously acquired channel information, extracts the difference, and updates transmission beamforming weights based on the difference.

PTL 1: International Publication No. WO2016/047409
PTL 2: International Publication No. WO2015/033930
PTL 3: Japanese Patent Kokai Publication No. JP2016-134841A
NPL 1: Shohei Yoshioka, et al., "Performance Evaluation of 5G Low-SHF-Band Massive MIMO with Digital Beamforming Using Two-Stage Channel Estimation", IEICE Technical Report RCS2016-238, January 2017

SUMMARY

As described above, the weight generation method disclosed in NPL 1 is directed to improving the channel response estimation accuracy. However, the method described in NPL 1 has a problem. Specifically, if the number of beams selected to improve the channel estimation accuracy is limited, since the number of estimated channel values used for weight generation is reduced, the separation performance of spatially multiplexed signals is deteriorated. Namely, in accordance with the method described in NPL 1, since improvement of the channel estimation accuracy and ensuring of the separation performance of spatially multiplexed signals could not be achieved, sufficient communication quality (for example, the throughput, transmission characteristics, etc.) could not be achieved.

It is an object of the present invention to provide a wireless apparatus and a wireless communication method that ensure the separation performance of spatially multiplexed signals while improving the channel estimation accuracy.

Solution to Problem

According to a first aspect of the present invention, there is provided a wireless apparatus, including: a first weight multiplication part that includes first weights, each of which corresponds to an individual one of a plurality of beams, and multiplies a signal(s) corresponding to a reference signal(s) transmitted from a wireless terminal(s) by the first weights; a channel estimation part that estimates first channel responses for the respective beams by using the signals obtained by the multiplication by the first weights; a channel response conversion part that converts the first channel responses into second channel responses by using the first weights; and a second weight generation part that generates second weights used for wireless communication with the wireless terminal(s) by using the second channel responses.

According to a second aspect of the present invention, there is provided a wireless communication method, including: multiplying a signal(s) including a reference signal(s) transmitted from a wireless terminal(s) by first weights, each of which corresponds to an individual one of a plurality of beams; estimating first channel responses for the respective beams by using the signals obtained by the multiplication by the first weights; converting the first channel responses into second channel responses by using the first weights; and generating second weights used for wireless communication with the wireless terminals) by using the second channel responses.

According to the individual aspects of the present invention, there are provided a wireless apparatus and a wireless communication method that contribute to ensuring the separation performance of spatially multiplexed signals while improving the channel estimation accuracy.

PREFERRED MODE

Figure 1:
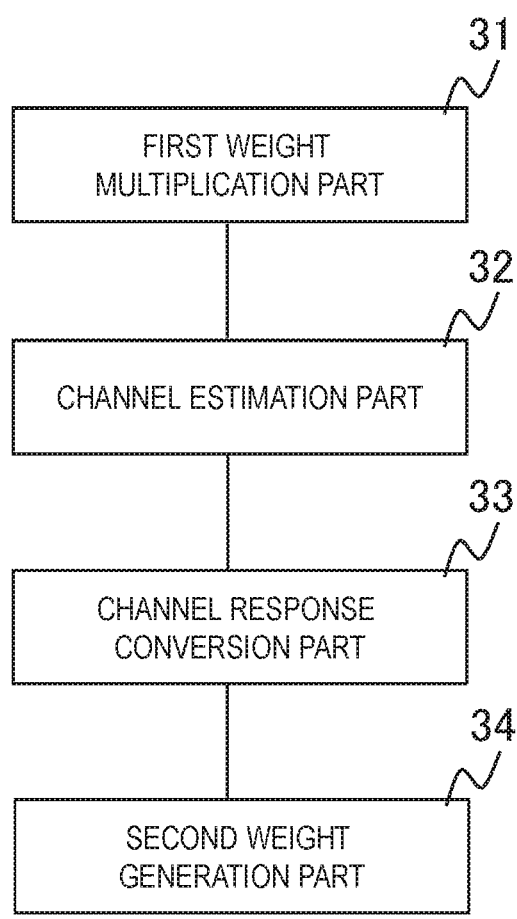
FIG. 1 illustrates an outline of an exemplary embodiment.

First, an outline of an exemplary embodiment will be described. The reference characters that denote various elements in the following outline are merely used as examples for convenience to facilitate understanding. Therefore, the description of the outline is not intended to impose any limitations. In addition, an individual connection line between blocks in an individual drawing signifies both one-way and two-way directions. An individual arrow schematically illustrates the principal flow of a signal (data) and does not exclude bidirectionality. While not explicitly illustrated in the circuit diagrams, the block diagrams, the internal configuration diagrams, the connection diagrams, etc. indicated in the disclosure of the present application, an input port and an output port exist at an input terminal and an output terminal of an individual connection line. The same holds true with regard to input-output interfaces.

A wireless apparatus 30 according to an exemplary embodiment includes a first weight multiplication part 31, a channel estimation part 32, a channel response conversion part 33, and a second weight generation part 34 (see FIG. 1). The first weight multiplication part 31 includes first weights, each of which corresponds to an individual one of a plurality of beams, and multiplies a signal(s) corresponding to a reference signal(s) transmitted from a wireless terminal(s) by the first weights. The channel estimation part 32 estimates first channel responses for the respective beams by using the signals obtained by the multiplication by the first weights. The channel response conversion part 33 converts the first channel responses into second channel responses by using the first weights. The second weight generation part 34 generates second weights used for wireless communication with the wireless terminal(s) by using the second channel responses.

The wireless apparatus 30 uses the channel estimation part 32 to estimate a first channel response for an individual one of a plurality of beams. Next, the wireless apparatus 30 uses the channel response conversion part 33 to perform conversion into second channel responses, each of which is for an antenna of the wireless apparatus 30, by using the first weights and the estimated first channel responses. Next, the wireless apparatus 30 generates second weights used for wireless communication with a wireless terminal(s) by using the second channel responses.

For example, when a wireless terminal(s) is located only in a certain area or the like, it is only necessary for the wireless apparatus 30 to adjust the directions of the beams formed by the first weights to the location of the wireless terminal(s). In this case, since the wireless apparatus 30 orients the beams in the direction in which transmission signals of the wireless terminal(s) are expected to come, the average estimation accuracy of the first channel responses can be improved, and as a result, the estimation accuracy of the second channel responses used to generate the second weights can be improved. In addition, the wireless apparatus 30 converts the first channel responses, which are formed by using the first weights and correspond to the respective beams, into the second channel responses corresponding to the respective antennas of the wireless apparatus 30 and generates the second weights by using the second channel responses. Namely, even if the wireless apparatus 30 limits the directions of the beams formed by the first weights based on the location of the wireless terminal(s) or the like, since the wireless apparatus 30 generates the weights by using the channel responses whose dimension corresponds to the number of antennas, the separation performance of the spatially multiplexed signals can be ensured. Namely, compared with a case in which the weights are generated by using the first channel responses whose dimension corresponds to the number of beams as disclosed in NPL 1, the weights having a larger dimension can be generated. Consequently, the separation performance of spatially multiplexed signals can be improved. Thus, the wireless apparatus 30 can maintain the separation performance of spatially multiplexed signals while improving the channel estimation accuracy.

Specific exemplary embodiments will hereinafter be described in more detail with reference to the accompanying drawings. In the individual exemplary embodiments, like components will be denoted by like reference characters, and description thereof will be omitted. In addition, in the following first to fourth exemplary embodiments described below, cases in which digital beamforming is realized by digital signal processing using a CPU 12 and a wireless signal transmission and reception circuit 14 described below will be described. However, the descriptions of the following first to fourth exemplary embodiments are not intended to limit realization of beamforming to the digital signal processing.

First Exemplary Embodiment

A first exemplary embodiment will be described in more detail with reference to drawings.

Figure 2:
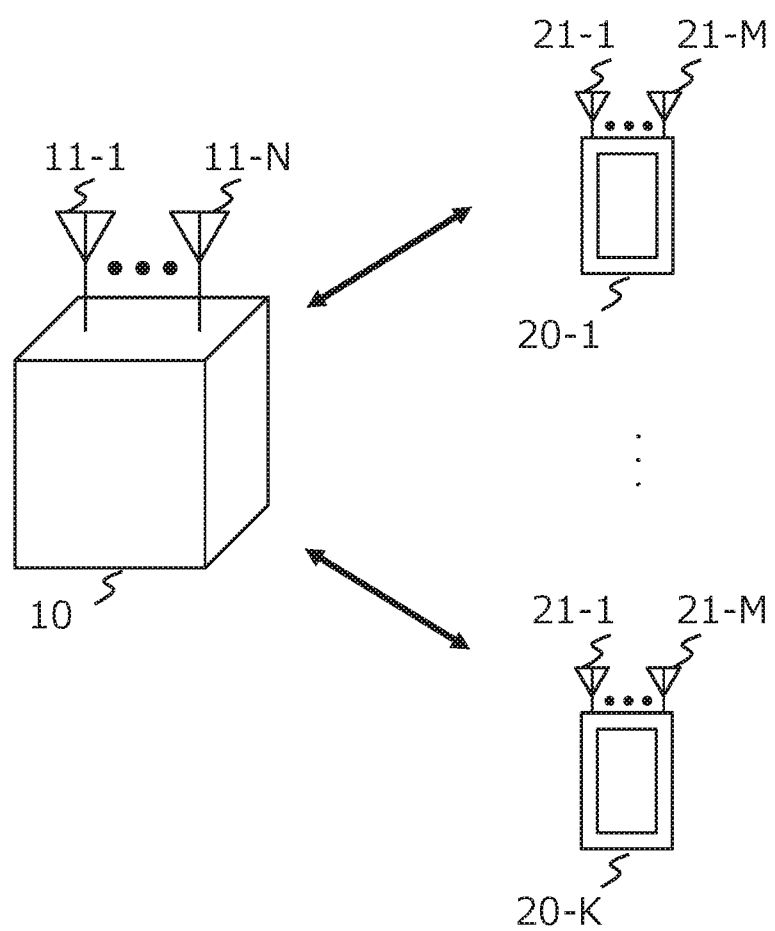
FIG. 2 illustrates a schematic configuration of a wireless communication system according to a first exemplary embodiment.

FIG. 2 illustrates a schematic configuration of a wireless communication system according to a first exemplary embodiment. As illustrated in FIG. 2, the wireless communication system includes a wireless apparatus 10 and terminals 20-1 to 20-K (K will hereinafter denote a positive integer). In the following description, unless there is a particular reason to distinguish the terminals 20-1 to 20-K from each other, an individual one of the terminals 20-1 to 20-K will simply be referred to as "a terminal 20". The terminals 20 are wireless terminals that perform wireless communication with the wireless apparatus 10.

While the wireless communication system includes the plurality of terminals 20 in FIG. 2, the present exemplary embodiment is applicable as long as the wireless communication system includes at least one terminal 20. In place of a terminal 20, a relay apparatus having a relay function may be included in the wireless communication system.

The wireless apparatus 10 is a base station or an access point and includes a plurality of antennas 11-1 to 11-N(N will hereinafter denote an integer of 2 or more). An individual one of the terminals 20 includes a plurality of antennas 21-1 to 21-M (M will hereinafter denote an integer of 2 or more). In the following description, unless there is a particular reason to distinguish the antennas 11-1 to 11-N from each other, an individual one of the antennas 11-1 to 11-N will simply be referred to as "an antenna 11". Likewise, unless there is a particular reason to distinguish the antennas 21-1 to 21-M from each other, an individual one of the antennas 21-1 to 21-M will simply be referred to as "an antenna 21". In addition, while FIG. 2 illustrates the terminals 20, each of which includes a plurality of antennas 21, an individual one of the terminals 20 does not need to include a plurality of antennas 21. The present exemplary embodiment is applicable as long as an individual one of the terminals 20 includes at least one antenna. In addition, while each of the terminals 20 includes a number M of antennas 21 in FIG. 2, each of the terminals 20 may have a different number of antennas 21.

[Hardware Configuration]

Figure 3:
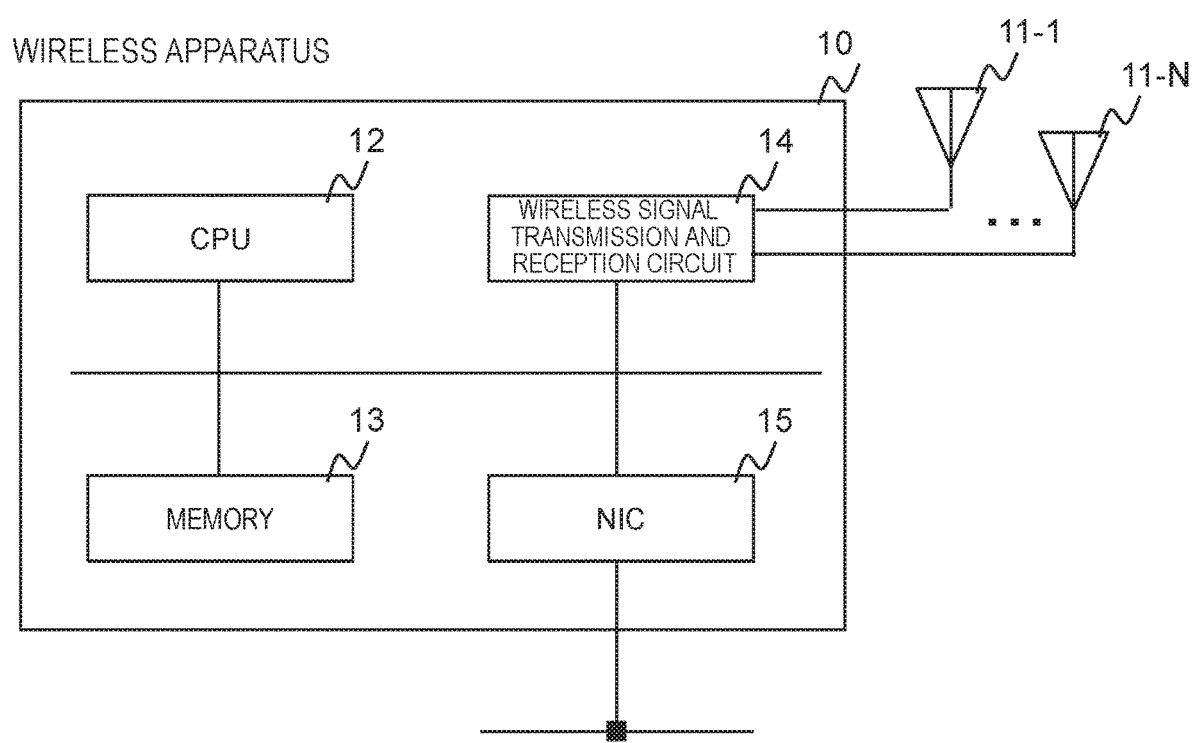
FIG. 3 illustrates an example of a hardware configuration of a wireless apparatus according to the first exemplary embodiment.

FIG. 3 illustrates an example of a hardware configuration of the wireless apparatus 10 according to the first exemplary embodiment. The wireless apparatus 10 has a configuration illustrated as an example in FIG. 3. For example, the wireless apparatus 10 includes the antennas 11 and a central processing unit (CPU) 12, a memory 13, a wireless signal transmission and reception circuit 14, and a network interface card (NIC) 15 serving as a communication interface, which are mutually connected via an internal bus.

The hardware configuration of the wireless apparatus 10 is not limited to that illustrated in FIG. 3. The wireless apparatus 10 may include a hardware component(s) not illustrated. In addition, for example, the number of CPUs included in the wireless apparatus 10 is not limited to one illustrated as an example in FIG. 3. For example, the wireless apparatus 10 includes a plurality of CPUs.

The memory 13 includes at least one of a random access memory (RAM), a read-only memory (ROM), an auxiliary storage device (a hard disk or the like), etc.

The wireless signal transmission and reception circuit 14 is connected to the antennas 11 and realizes wireless communication with the terminals 20. The antennas 11 receive wireless signals including reference signals transmitted from the terminals 20 and output the received signals to the wireless signal transmission and reception circuit 14. The antennas 11 may form a planar array configuration in which antenna elements are arranged in a horizontal direction and a vertical direction.

The wireless signal transmission and reception circuit 14 decodes received data from the wireless signals and outputs the received data that has been decoded to the CPU 12. In addition, the wireless signal transmission and reception circuit 14 acquires transmitted data from the CPU 12 and transmits the transmitted data to the terminals 20 via the antennas 11. The present exemplary embodiment assumes that the reference signals transmitted from the terminals 20 are known by the wireless apparatus 10 (there is an agreement on the reference signals transmitted and received between the wireless apparatus 10 and the terminals 20).

Since the hardware configurations and functions of the terminals 20 are apparent to those skilled in the art, description thereof will be omitted.

Figure 4:
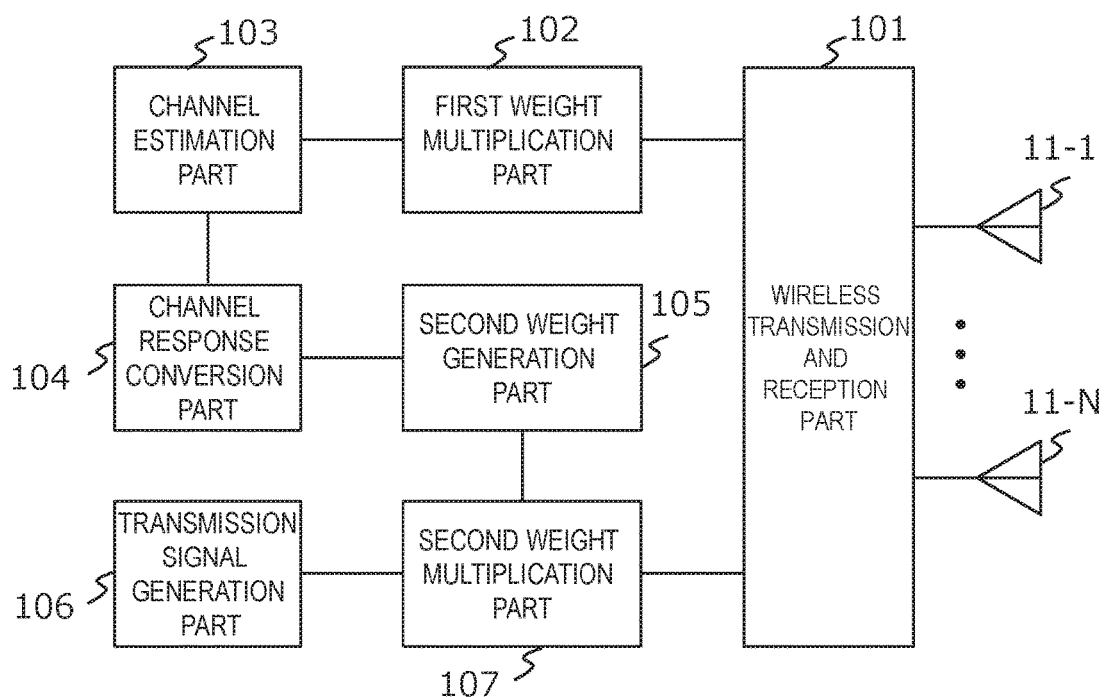
FIG. 4 illustrates an example of an internal configuration of a wireless signal transmission and reception circuit according to the first exemplary embodiment.

FIG. 4 illustrates an example of an internal configuration of the wireless signal transmission and reception circuit 14 according to the first exemplary embodiment. As illustrated in FIG. 4, the wireless signal transmission and reception circuit 14 includes a wireless transmission and reception part 101, a first weight multiplication part 102, a channel estimation part 103, a channel response conversion part 104, a second weight generation part 105, a transmission signal generation part 106, and a second weight multiplication part 107.

The wireless transmission and reception part 101 converts wireless signals (reception signals) acquired from the antennas 11 into baseband signals and outputs the baseband signals to the first weight multiplication part 102. Depending on the wireless communication method, processing modules that perform processing for timing detection, removal of cyclic prefixes (CPs), fast Fourier transform (FFT), etc. are needed between the wireless transmission and reception part 101 and the first weight multiplication part 102. However, since the processing is not directly related to the disclosure of the present application and is apparent to those skilled in the art, illustration and description thereof will be omitted.

The first weight multiplication part 102 includes first weights, each of which corresponds to an individual one of a plurality of beams (first weights are stored in advance in a storage device, a register, or the like). The first weight multiplication part 102 multiplies a baseband signal acquired from the wireless transmission and reception part 101 by the first weights, each of which corresponds to an individual one of the plurality of beams. Next, the first weight multiplication part 102 gives the signals, each of which is obtained by the multiplication by a corresponding first weight and corresponds to one of the beams, to the channel estimation part 103.

The channel estimation part 103 estimates first channel responses for the respective beams by using the signals obtained by the multiplication by the first weights. More specifically, the channel estimation part 103 estimates a channel response for an individual one of the plurality of beams, based on the signals acquired from the first weight multiplication part 102 (the signals obtained by the multiplication by the first weights) and a corresponding reference signal. Next, the channel estimation part 103 gives the estimated channel response values to the channel response conversion part 104.

The channel response conversion part 104 converts the first channel responses into second channel responses by using the first weights. More specifically, the channel response conversion part 104 converts a channel response per beam acquired from the channel estimation part 103 into a channel response per antenna 11 by using the first weights used by the first weight multiplication part 102. The channel response conversion part 104 gives the converted channel responses to the second weight generation part 105.

The second weight generation part 105 generates second weights used for communication with the corresponding terminal by using the second channel responses. More specifically, the second weight generation part 105 generates second weights corresponding to the respective signals spatially multiplexed by using the channel response per antenna 11 acquired from the channel response conversion part 104. Next, the second weight generation part 105 gives the generated second weights to the second weight multiplication part 107.

The transmission signal generation part 106 performs processing for encoding, modulation, etc. on the transmission data acquired from the CPU 12 and outputs the modulated signal generated to the second weight multiplication part 107. The transmitted data size, the modulation method, etc. are determined by a scheduler (not illustrated). Since the scheduler is not directly related to the disclosure of the present application and is apparent to those skilled in the art, description thereof will be omitted.

When orthogonal frequency division multiple access (OFDMA), single carrier-frequency division multiple access (SC-FDMA), or the like is used as the multiple access scheme, a processing module that maps the modulated signal to wireless resources is needed after the transmission signal generation part 106. However, since this module is also apparent to those skilled in the art, illustration and description thereof will be omitted.

The second weight multiplication part 107 multiplies the modulated signal acquired from the transmission signal generation part 106 by the second weights acquired from the second weight generation part 105. The second weight multiplication part 107 outputs the modulated signal multiplied by the second weights to the wireless transmission and reception part 101. When a plurality of modulated signals are spatially multiplexed, after the multiplication by the second weights, the second weight multiplication part 107 may synthesize the plurality of modulated signals and output the resultant data to the wireless transmission and reception part 101.

In addition, depending on the wireless communication method, processing modules that perform inverse fast Fourier transform (IFFT), addition of cyclic prefixes (CPs), etc. are needed between the second weight multiplication part 107 and the wireless transmission and reception part 101. However, since these processing modules are not directly related to the disclosure of the present application and are apparent to those skilled in the art, illustration and description thereof will be omitted.

The wireless transmission and reception part 101 converts the baseband signals acquired from the second weight multiplication part 107 into wireless signals (transmission signals) and outputs the wireless signals to the antennas 11.

The antennas 11 transmit the wireless signals acquired from the wireless transmission and reception part 101.

Next, an operation of the wireless apparatus 10 according to the first exemplary embodiment will be described.

Figure 5:
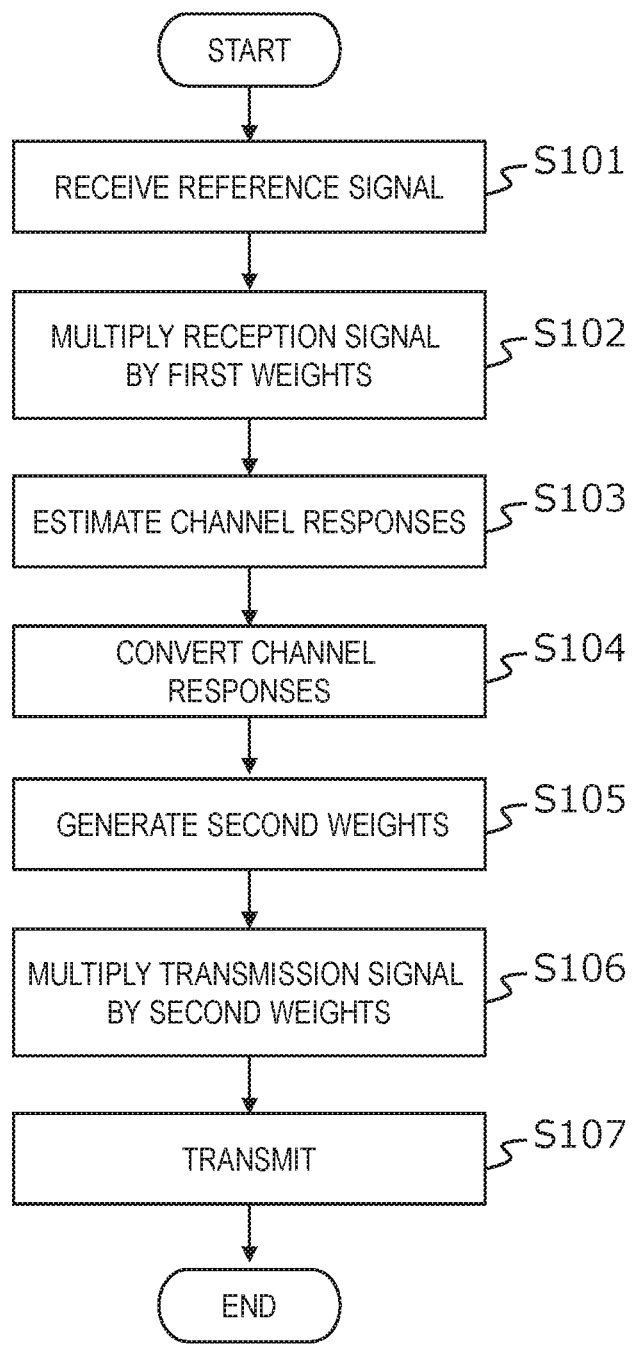
FIG. 5 is a flowchart illustrating an example of an operation of the wireless apparatus according to the first exemplary embodiment.

FIG. 5 is a flowchart illustrating an example of an operation of the wireless apparatus according to the first exemplary embodiment.

In step S101, the antennas 11 receive a wireless signal including a data signal and a reference signal transmitted from an individual terminal 20. Next, the wireless signal is inputted to the wireless transmission and reception part 101 and is converted into a baseband signal.

In step S102, the first weight multiplication part 102 multiplies the baseband signal acquired from the wireless transmission and reception part 101 by first weights, each of which corresponds to an individual one of a plurality of beams. More specifically, assuming that y denotes an N-dimensional reception signal vector by the N antennas 11 of the wireless apparatus 10 and $a_b$ denotes an N-dimensional first weight vector corresponding to the b-th beam among the B beams ($1 \leq B < N$), the multiplication processing in step S102 can be expressed by the following expression (1).

$$a_b^H y \tag{1}$$

In expression (1), H denotes a Hermitian transpose. The processing in expression (1) is performed on all the B beams (the processing in expression (1) is performed on b=1 to B). As described above, B is the number of beams and is smaller than N (B<N) in the first exemplary embodiment. The first weights will be described in detail below.

In step S103, the channel estimation part 103 estimates channel responses for the respective B beams by using the signals obtained by the multiplication by the first weights and the corresponding reference signal. Specifically, assuming that $S_{RS,k,m}$ denotes the reference signal transmitted from the m-th antenna of the kth terminal among the K terminals 20, a channel response $q_{k,m,b}$ corresponding to the b-th beam for the m-th antenna of the kth terminal can be estimated by the following expression (2).

$$q_{k,m,b} = \frac{S^*_{RS,k,m}}{|S_{RS,k,m}|^2} \cdot a_b^H y \tag{2}$$

In expression (2), * denotes a complex conjugate.

Processing such as weighted averaging may be performed on the estimated channel response values in the frequency direction or the time direction. Alternatively, step S102 and step S103 are interchangeable. Namely, after the channel response is estimated per antenna, the estimated values may be multiplied by the first weights, to obtain the channel response per beam.

In step S104, the channel response conversion part 104 converts the channel response per beam estimated in step S103 into the channel response per antenna 11 by using the first weights. Specifically, the channel response conversion part 104 converts the channel responses by using the following expression (3).

$$h_{k,m} = \sum_{b=1}^{B} q_{k,m,b} a_b \tag{3}$$

In expression (3), $h_{k,m}$ denotes the N-dimensional channel response vector (channel response) for the m-th antenna of the kth terminal. As described above, the channel response conversion part 104 converts the first channel responses into the second channel responses by synthesizing products of the first weights and the first channel responses for the respective beams.

Alternatively, the channel responses may be converted by using any one of the following expressions (4) to (6) in place of expression (3).

$$h_{k,m} = (AA^H)^{-1} A q_{k,m} \quad (4)$$

$$h_{k,m} = (AA^H + \delta \cdot I_N)^{-1} A q_{k,m} \quad (5)$$

$$h_{k,m} = A(A^H A)^{-1} q_{k,m} \quad (6)$$

In expressions (4) to (6), $X^{-1}$ denotes an inverse matrix of a matrix X. In addition, A denotes an N×B-dimensional first weight matrix having a first weight vector corresponding to an individual beam as an individual column vector. $q_{k,m}$ denotes a B-dimensional channel response vector having a channel response corresponding to an individual beam for the m-th antenna of the kth terminal as an element. $I_N$ denotes an N×N-dimensional identity matrix. In addition, $\delta$ is a coefficient, which is a real number of 0 or more.

A and $q_{k,m}$ can be expressed by the following expressions (7) and (8).

$$A = (a_1 \ldots a_B) \quad (7)$$

$$q_{k,m}^T = (q_{k,m,1} \ldots q_{k,m,B}) \quad (8)$$

In expression (8), T denotes transposition.

In step S105, the second weight generation part 105 generates second weights, each of which correspond to an individual one of spatially multiplexed signals, by using the channel responses converted by the channel response conversion part 104. A scheduler selects a combination of spatially multiplexed terminals and notifies the second weight generation part 105 of the combination.

For generation of the second weights, for example, Zero Forcing (ZF) criteria or Minimum Mean Square Error (MMSE) criteria may be used.

Assuming that the number of spatially multiplexed terminals is $K_s$ ($K_s$ will hereinafter denote an integer that satisfies $1 \leq K_s \leq K$) and a $K_s$ M×N-dimensional channel response matrix having the N-dimensional channel response vector corresponding to an individual antenna of an individual terminal acquired from the channel response conversion part 104 as an individual row vector is H, the second weights using the ZF criteria are generated by the following expression (9).

$$W = H^H (HH^H)^{-1} \quad (9)$$

In expression (9), W is an N×$K_s$ M-dimensional second weight matrix having a second weight of an individual spatially multiplexed signal as an individual column vector. The present exemplary embodiment assumes that M signals are transmitted to each of the $K_s$ terminals. The size of each column vector of W may be normalized to 1.

In step S106, the second weight multiplication part 107 multiplies the modulated signal generated by the transmission signal generation part 106 by the second weights and synthesizes the modulated signals obtained by the multiplication by the second weights based on the combination of spatially multiplied signals.

In step S107, the wireless transmission and reception part 101 converts the baseband signals into wireless signals, which are transmitted from the antennas 11.

Next, the first weights will be described in detail. The first exemplary embodiment assumes that the locations of the terminals 20 are limited in a certain area with respect to the wireless apparatus 10. Under this limitation, it is possible to grasp the direction in which radio waves are coming to some extent. The following first exemplary embodiment assumes that the first weights have already been selected under the above condition, and the first weights will be described in detail.

For example, weights having an orthogonal relation to each other between two arbitrary beams are used as the first weights. Namely, the first weights of two arbitrary beams among a plurality of beams are orthogonal to each other. Specifically, weights satisfying the following expression (10) are used for arbitrary beam numbers b1 and b2 (b1≠b2).

$$a_{b1}^H a_{b2} = 0 \quad (10)$$

By using weights satisfying the orthogonal relation in expression (10) as the first weights, a larger area can be covered with a fewer number of beams.

For example, discrete Fourier transform (DFT) matrixes are used as the weights whose beams are orthogonal to each other. Namely, DFT matrixes can be used the first weights.

When the antennas 11 have a planar array configuration ($N = N_x \times N_z$) in which $N_x$ elements are arranged in the horizontal direction and $N_z$ elements are arranged in the vertical direction, a Kronecker product of DFT matrixes in the horizontal direction and the vertical direction is used as a first weight, for example. The N-dimensional first weight vector $a_b$ of the b-th beam can be expressed by the following expressions (11) and (12).

$$a_b^T = [\, a_b(0, 0) \ \ldots \ a_b(0, N_z-1) \ a_b(1, 0) \ \ldots \ a_b(N_x-1, N_z-1)\,] \quad (11)$$

$$a_b(n_x, n_z) = \frac{1}{\sqrt{N_x N_z}} \exp\left\{ j \frac{2\pi}{N_x N_z} [n_x N_z i_x(b) + n_z N_x i_z(b)] \right\} \quad (12)$$

In expression (12), $i_x(b)$ denotes a horizontal-direction beam number of the b-th beam, which is 0 or more and $N_x$ or less, and $i_z(b)$ is a vertical-direction beam number of the b-th beam, which is 0 or more and $N_z$ or less. Among the B beams, $i_x(b)$ and $i_z(b)$ are set in such a manner that the combination of $i_x(b)$ and $i_z(b)$ does not overlap. As described above, when the antennas 11 have a planar array configuration in which antenna elements are arranged in the horizontal direction and the vertical direction, a Kronecker product of a discrete Fourier transform (DFT) matrix in the horizontal direction and a DFT matrix in the vertical direction can be used as a first weight.

For example, the values of $i_x(b)$ and $i_z(b)$ may be set based on the location of a terminal 20. In this way, since beams are oriented in the direction in which transmission signals from the terminal 20 are expected to come, the channel estimation accuracy can be improved. Alternatively, reception power may be measured per beam, and the values of $i_x(b)$ and $i_z(b)$ whose reception power is statistically large may be selected.

The weight in expression (12) may be generalized and expressed as the following expression (13).

$$a_b(n_x, n_z) = \frac{1}{\sqrt{N_x N_z}} \exp \quad (13)$$

$$\left\{ j \frac{2\pi}{N_x N_z} [n_x N_z i_x(b) + n_z N_x i_z(b)] + j \frac{2\pi}{\lambda} (n_x d_x \sin\theta \cos\phi + n_z d_z \cos\theta) \right\}$$

In expression (13), $\lambda$ denotes the wavelength, $d_x$ and $d_z$ denote the intervals between the antenna elements in the horizontal direction and the vertical direction, respectively. In addition, $\varphi$ and $\theta$ denote the azimuth angle and the zenith angle of the main lobe of the reference beam ($i_x(b) = i_z$ (b)=0). Namely, while the azimuth angle and the zenith angle of the main lobe of the reference beam are both 90 degrees when expression (12) is used, the main lobe of the reference beam can be set in an arbitrary direction when expression (13) is used.

As another example of a first weight, an arbitrary weight may be used among a plurality of DFT matrixes different from each other. For example, when $F_x$ DFT matrixes in the horizontal direction and $F_z$ DFT matrixes in the vertical direction are used, namely, when a total of $F_x F_z$ DFT matrixes are used, expression (12) can be replaced by the following expression (14) to express the weight.

$$a_b(n_x, n_z) = \frac{1}{\sqrt{N_x N_z}} \exp\left\{ j\frac{2\pi n_x i_x(b)}{F_x N_x} + j\frac{2\pi n_z i_z(b)}{F_z N_z} \right\} \quad (14)$$

In expression (14), $i_x$ (b) is 0 or more and $F_x N_x$ or less, and $i_z$ (b) is 0 or more and $F_z N_z$ or less. A beam having $f_x$ as a remainder of the division of $i_x$ (b) by $F_x$ corresponds to the $f_x$-th DFT matrix in the horizontal direction. The same applies to the vertical direction.

As another example, a weight that orients the main lobe in a certain direction is used as a first weight. The N-dimensional first weight vector $a_b$ of the b-th beam that orients the main lobe in an azimuth angle $\varphi_b$ and a zenith angle $\theta_b$ can be expressed by expression (11) and the following expression (15).

$$a_b(n_x, n_z) = \frac{1}{\sqrt{N_x N_z}} \exp\left[ j\frac{2\pi}{\lambda}(n_x d_x \sin\theta_b \cos\phi_b + n_z d_z \cos\theta_b) \right] \quad (15)$$

The values of $\varphi_b$ and $\theta_b$ can be set based on the location of the terminal 20, for example. For example, the reception signal power may be measured, and a direction in which the reception power is statistically large may be selected.

If the antennas 11 have a planar array configuration of two polarized waves ($N=N_x \times N_z \times 2$), a beam may be independently formed per polarized wave.

Assuming that the elements of the N-dimensional first weight vector $a_b$, namely, $N_x \times N_z$ weights of the first polarized wave and $N_x \times N_z$ weights of the second polarized wave, are arranged in this order, when the b-th beam corresponds to the first polarized wave, the N-dimensional first weight vector $a_b$ of the b-th beam can be expressed by the following wave (16).

$$a_b^T = [a_b(0,0) \ldots a_b(0,N_z-1)a_b(1,0) \ldots a_b(N_x-1,N_z-1)0 \ldots 0] \quad (16)$$

In contrast, when the b-th beam corresponds to the second polarized wave, the N-dimensional first weight vector $a_b$ of the b-th beam can be expressed by the following wave (17).

$$a_b T_r = [0 \ldots 0 \, a_b(0,0) \ldots a_b(0,N_z-1)a_b(1,0) \ldots a_b(N_x-1,N_z-1)] \quad (17)$$

As described above, according to the first exemplary embodiment, since the wireless apparatus 10 converts the channel response estimated per beam into the channel response per antenna 11 and generates the weights by using the converted channel responses, it is possible to maintain the separation performance of spatially multiplexed signals while improving the channel estimation accuracy. Thus, the communication quality can be improved.

Second Exemplary Embodiment

Next, a second exemplary embodiment will be described in detail with reference to drawings.

According to the second exemplary embodiment, a wireless apparatus includes a beam selection function and converts channel responses of selected beams into a channel response per antenna.

Figure 6:
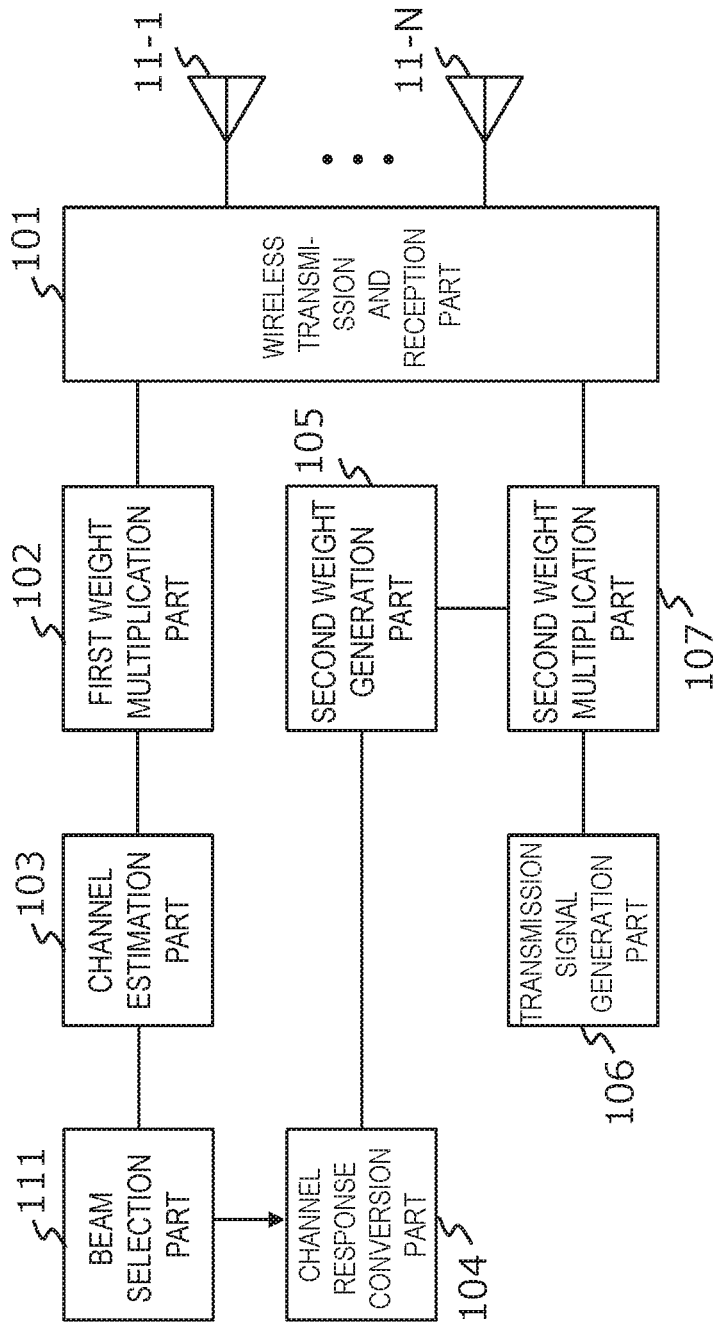
FIG. 6 illustrates an example of an internal configuration of a wireless signal transmission and reception circuit included in a wireless apparatus according to a second exemplary embodiment.

FIG. 6 illustrates an example of an internal configuration of a wireless signal transmission and reception circuit 14a included in a wireless apparatus 10a according to the second exemplary embodiment. As illustrated in FIG. 6, unlike the equivalent circuit according to the first exemplary embodiment, the wireless signal transmission and reception circuit 14a according to the second exemplary embodiment includes a beam selection part 111.

The beam selection part 111 selects beams used by the channel response conversion part 104 from a plurality of beams, by using the first channel responses. More specifically, the beam selection part 111 selects beams, based on the channel response per beam acquired from the channel estimation part 103. The beam selection part 111 gives information about the selected beams and the channel responses of the beams to the channel response conversion part 104.

The channel response conversion part 104 converts the channel responses of the beams selected by the beam selection part 111 into the channel response per antenna 11. Since other configurations are the same as those according to the first exemplary embodiment, description thereof will be omitted.

Figure 7:
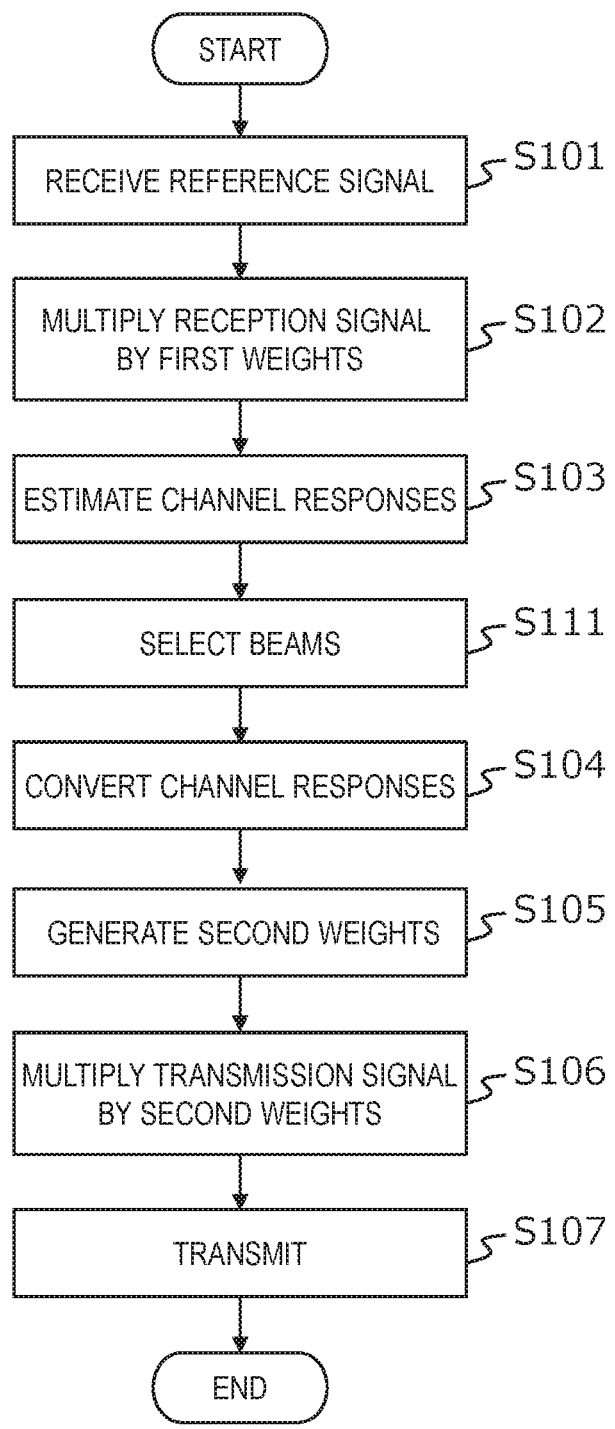
FIG. 7 is a flowchart illustrating an example of an operation of the wireless apparatus according to the second exemplary embodiment.

FIG. 7 is a flowchart illustrating an example of an operation of the wireless apparatus 10a according to the second exemplary embodiment. In FIG. 7 and the subsequent figures, the same processing (steps) as that described in FIG. 5 will be denoted by the same reference characters, and description thereof will be omitted.

As illustrated FIG. 7, the wireless apparatus 10a according to the second exemplary embodiment differs from the wireless apparatus 10 according to the first exemplary embodiment in that the wireless apparatus 10a selects beams used for channel response conversion based on the channel response per beam (step S111). In addition, according to the second exemplary embodiment, the channel response conversion part 104 converts the channel responses of the beams selected in step S111 into the channel response per antenna 11 (step S104).

While the number B of beams is less than N according to the first exemplary embodiment, since beams whose reception quality is good are selected by the beam selection part 111 according to the second exemplary embodiment, the number B of beams is not limited. In addition, as in the first exemplary embodiment, DFT matrixes or weights that orient the main lobe in a certain direction can be used as the first weights. Since other operations are the same as those according to the first exemplary embodiment, description thereof will be omitted.

Next, the beam selection method performed by the beam selection part 111 will be described in detail.

For example, the beam selection part 111 may compare the square of the magnitude of the channel response per beam with a predetermined value. In this case, if the square of the magnitude of a channel response is larger than the predetermined value, the beam selection part 111 may select the corresponding beam. If there is no beam that satisfies this condition, the beam selection part 111 may select a beam whose channel response magnitude is the largest. As the predetermined value, for example, a value obtained by multiplying the ratio between the noise power of the wireless apparatus 10a and the transmission power of the reference signal of the corresponding terminal 20 by a coefficient can be used.

Assuming that the noise power of the wireless apparatus 10a is $\sigma^2$, the transmission power of the reference signal of the corresponding terminal 20 is $P_{R\_S}$, and the coefficient is $\alpha$, the beam selection part 111 selects a beam that satisfies the following expression (18).

$$|q_{k,m,b}|^2 > \frac{\alpha\sigma^2}{P_{RS}} \tag{18}$$

In expression (18), a real number of 0 or more can be used as the coefficient $\alpha$. As described above, the beam selection part 111 selects beams used by the channel response conversion part 104 from a plurality of beams by using the power of the reference signal from the corresponding terminal 20 and the noise power of the wireless apparatus 10a.

A value assumed as an appropriate thermal noise or a measured value may be used as the noise power $\sigma^2$ of the wireless apparatus 10a. In addition, as the square of the magnitude of the channel response in expression (18), a value obtained by averaging in the frequency direction or the time direction may be used.

As another example of the beam selection method, the squares of the magnitudes of the channel responses are determined, and a predetermined number of beams are selected in descending order of square. Alternatively, the ratio between the square of the magnitude of an individual channel response and the maximum value of the squares of the magnitudes of the channel responses may be calculated, the ratio(s) equal to or more than a predetermined value may be determined, and a corresponding beam(s) may be selected. Alternatively, the above plurality of selection methods may be combined.

If highly correlated beams are selected, since there are cases in which the channel response conversion processing is not appropriately performed, beams having a low correlation may be preferentially selected. For example, when $F_x$ $F_z$ DFT matrixes expressed by expression (14) are used as the first weights, a beam can be selected from any one of the DFT matrixes. In this case, the DFT matrix corresponding to the selected beam is a DFT matrix corresponding to a beam whose channel response is the maximum. When an antenna is formed by two polarized waves, a DFT matrix can be selected for each of the polarized waves.

In the above examples of the beam selection method, while beams are selected based on the channel response per beam, beams may be selected based on a sum of channel responses of a plurality of beams. For example, when DFT matrixes are used as the first weights, beams are selected in such a manner that the smallest number of beams are selected under the condition that a sum of the squares of the magnitudes of the channel responses of the beams not selected among the beams included in the selection target DFT matrixes is equal to or less than a predetermined value. Namely, beams are selected in such a manner that the smallest number of beams are selected under the conditions in which the following wave (19) is satisfied.

$$\sum_{b\notin C_{k,m} \& b\in D_{k,m}} |q_{k,m,b}|^2 \leq \frac{\varepsilon N\sigma^2}{P_{RS}} \tag{19}$$

In expression (19), $\varepsilon$ denotes a real number of 0 or more, $C_{k,m}$ denotes a group of beams selected for the m-th antenna of the kth terminal, and $D_{k,m}$ denotes a group of beams included in the DFT matrixes selected for the m-th antenna of the kth terminal.

The conversion of the channel responses according to the second exemplary embodiment is performed by, for example, the following expression (20).

$$h_{k,m} = \sum_{b\in C_{k,m}} q_{k,m,b} a_b \tag{20}$$

As another example of the channel response conversion method, an $N \times |C_{k,m}|$-dimensional first weight matrix A having the first weight vectors of the selected beams as the individual column vectors and a $|C_{k,m}|$-dimensional channel response vector $q_{k,m}$ having the channel responses of the beams selected for the m-th antenna of the kth terminal as the elements are defined, and the channel responses are converted by any of the above expression (4) to (6) using A and $q_{k,m}$.

As described above, according to the second exemplary embodiment, the wireless apparatus 10a includes the beam selection part 111, and the channel responses of the selected beams are converted into the channel response per antenna. As a result, the estimation accuracy of the channel responses used to generate the weights can be improved, and the separation performance of spatially multiplexed signals can be improved.

Third Exemplary Embodiment

According to a third exemplary embodiment, orthogonalization processing is performed on the converted channel responses, and the weights are generated by using the orthogonalized channel responses.

Figure 8:
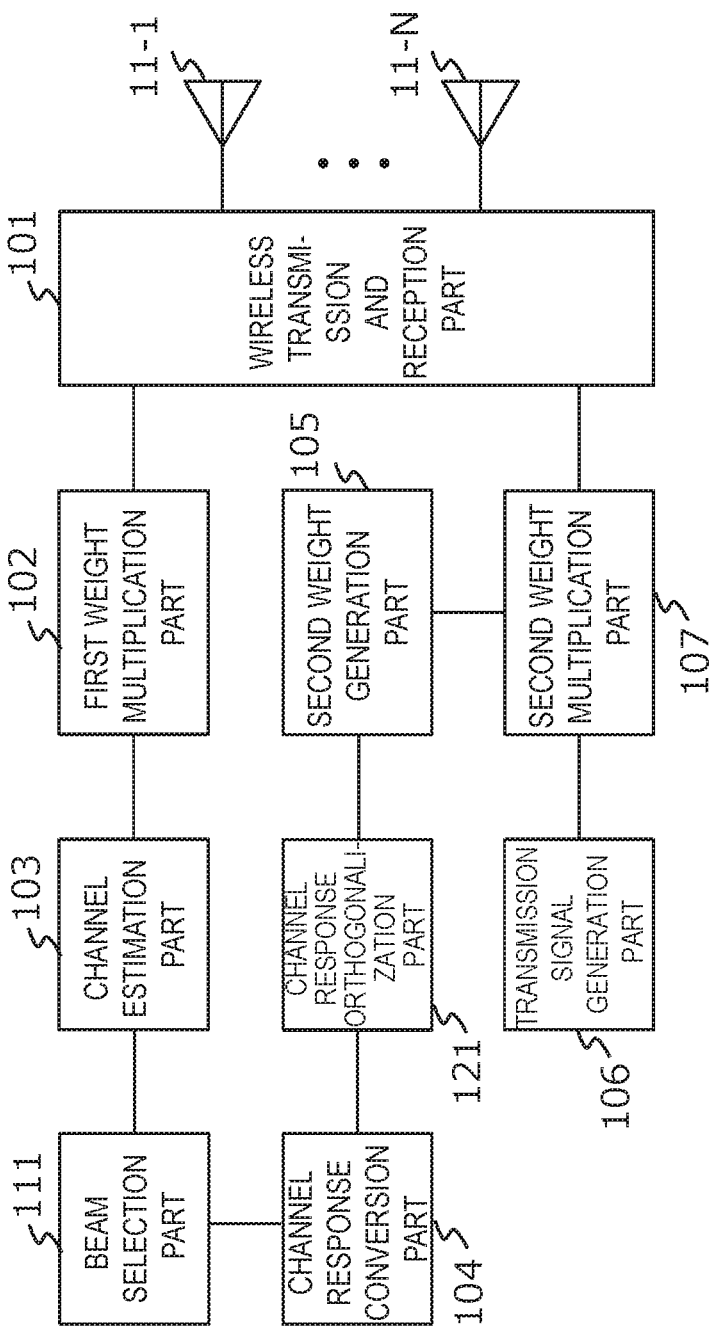
FIG. 8 illustrates an example of an internal configuration of a wireless signal transmission and reception circuit included in a wireless apparatus according to a third exemplary embodiment.

FIG. 8 illustrates an example of an internal configuration of a wireless signal transmission and reception circuit 14b included in a wireless apparatus 10b according to the third exemplary embodiment. As illustrated in FIG. 8, unlike the equivalent circuit according to the second exemplary embodiment, the wireless signal transmission and reception circuit 14b according to the third exemplary embodiment includes a channel response orthogonalization part 121.

The channel response orthogonalization part 121 performs orthogonalization processing such as singular value decomposition or eigenvalue decomposition on the channel responses acquired from the channel response conversion part 104. The channel response orthogonalization part 121 gives the orthogonalized channel responses to the second weight generation part 105.

The second weight generation part 105 generates the second weights by using the orthogonalized channel responses. Since other configurations are the same as those according to the second exemplary embodiment, description thereof will be omitted.

Figure 9:
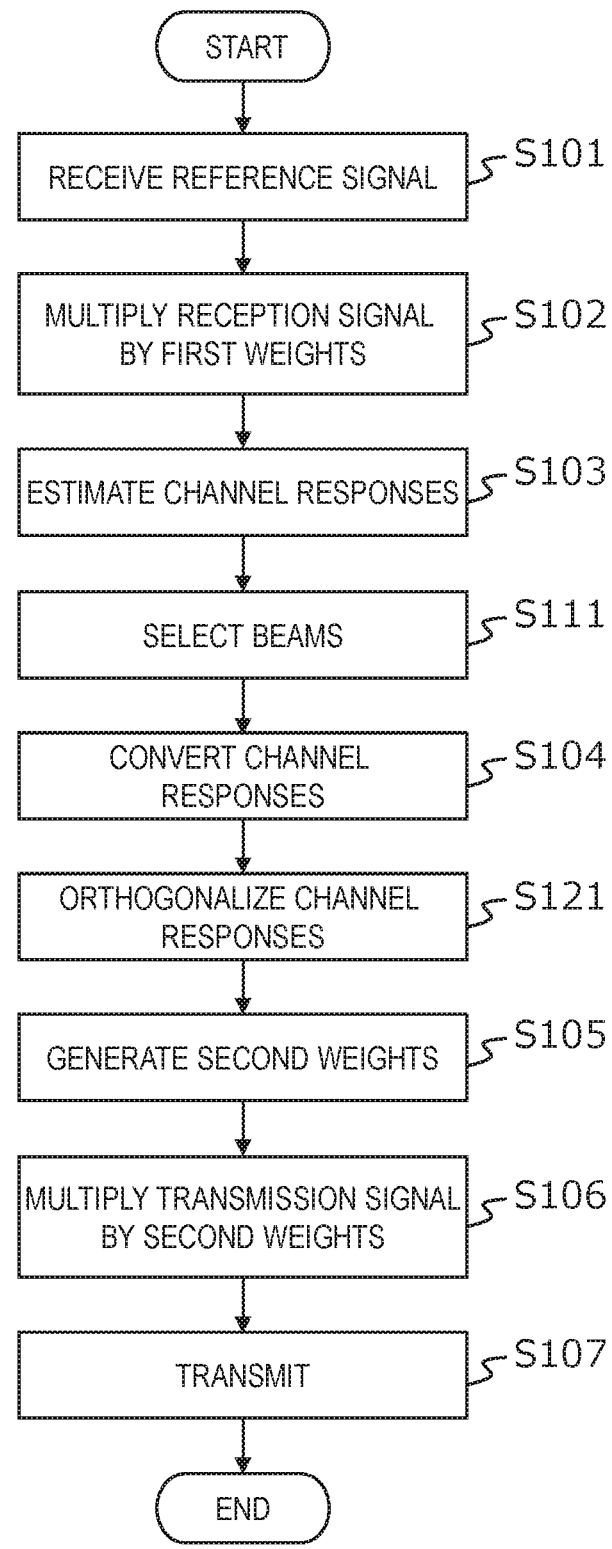
FIG. 9 is a flowchart illustrating an example of an operation of the wireless apparatus according to the third exemplary embodiment.

FIG. 9 is a flowchart illustrating an example of an operation of the wireless apparatus 10b according to the third exemplary embodiment. As illustrated in FIG. 9, the wireless apparatus 10b according to the third exemplary embodiment performs orthogonalization processing on the channel responses, unlike the wireless apparatus 10a according to the second exemplary embodiment (step S121). In addition, the second weight generation part 105 generates the second weights by using the orthogonalized channel responses (step S105). Since other operations are the same as those according to the second exemplary embodiment, description thereof will be omitted.

Next, the channel response orthogonalization method performed by the channel response orthogonalization part 121 will be described in detail.

Prior to the orthogonalization processing, the channel response orthogonalization part 121 generates an M×N-dimensional channel response matrix per terminal 20 by using the channel responses acquired from the channel response conversion part 104. The M×N-dimensional channel response matrix $H_k$ of the kth terminal can be expressed by the following expression (21) using an N-dimensional channel response vector $h_{k,m}$ for the m-th antenna of the kth terminal.

$$H_k^T = (h_{k,1} \ldots h_{k,M}) \quad (21)$$

Next, the channel response orthogonalization part 121 orthogonalizes the M×N-dimensional channel response matrix per terminal 20 by singular value decomposition, for example. The singular value decomposition of the M×N-dimensional channel response matrix $H_k$ of the kth terminal can be expressed by the following expression (22).

$$H_k = U_k \Sigma_k V_k^H \quad (22)$$

In expression (22), $U_k$ denotes an M×M-dimensional matrix having left-singular vectors as the individual column vectors, $\Sigma_k$ denotes an M×N-dimensional matrix having singular values as the diagonal components and 0 as the non-diagonal components, and $V_k$ denotes an N×N-dimensional matrix having right-singular vectors as the individual column vectors.

As another example of the orthogonalization method, eigenvalue decomposition is performed on a product of the Hermitian transpose of a channel response matrix and the channel response matrix. The eigenvalue decomposition on the channel response matrix of the kth terminal can be expressed by the following expression (23).

$$H_k^H H_k = V_k \Lambda_k V_k^H \quad (23)$$

In expression (23), $\Lambda_k$ denotes an N×N-dimensional matrix having eigenvalues as the diagonal components and 0 as the non-diagonal components, and $V_k$ denotes an N×N-dimensional matrix having eigenvectors as the individual column vectors. The matrix $V_k$ calculated by expression (23) is equivalent to $V_k$ calculated by expression (22). In addition, the square root of an eigenvalue in expression (23) is equivalent to a singular value in expression (22).

The product of the Hermitian transpose of a channel response matrix and the channel response matrix or the channel response matrix may be averaged in the time direction or the frequency direction prior to the orthogonalization processing. In addition, a number M of combinations of singular values and right-singular vectors or eigenvalues and eigenvectors can be selected in descending order of singular value or eigenvalue and outputted to the second weight generation part 105.

Next, an example of the second weight generation method according to the third exemplary embodiment will be described.

First, the second weight generation part 105 generates an N-dimensional orthogonalized channel response vector for an individual one of the signals spatially multiplexed. To generate the orthogonalized channel response vector, a singular value and a right-singular vector or an eigenvalue and an eigenvector are used. A scheduler or the second weight generation part 105 determines the singular value and the right-singular vector or the eigenvalue and the eigenvector used for an individual signal.

When an eigenvalue and an eigenvector are used, assuming that $\lambda_l$ denotes an eigenvalue used for the l-th (l will hereinafter denote a positive integer) signal and $v_l$ denotes an N-dimensional eigenvector, an N-dimensional orthogonalized channel response vector $g_l$ for the l-th signal can be expressed by the following expression (24).

$$g_l = \lambda_l v_l^* \quad (24)$$

Next, the second weight generation part 105 generates an L×N-dimensional matrix G having an N-dimensional orthogonalized channel response vector for an individual one of the signals spatially multiplexed as an individual row vector by using the following expression (25).

$$G^T = (g_1 \ldots g_L) \quad (25)$$

In expression (25), L denotes the number of spatially multiplexed signals.

Next, by using the L×N-dimensional matrix G, the second weight generation part 105 generates an N×L-dimensional second weight matrix having a second weight for an individual one of the signals spatially multiplexed as an individual column vector.

When the second weight generation part 105 generates the second weights based on the ZF criteria, the N×L-dimensional second weight matrix W can be expressed by the following expression (26).

$$W = G^H (GG^H)^{-1} \quad (26)$$

When the second weight generation part 105 generates the second weights based on the MMSE criteria, the N×L-dimensional second weight matrix W can be expressed by the following expression (27).

$$W = G^H \left( GG^H + \frac{L\sigma'^2}{P} I_L \right)^{-1} \quad (27)$$

In expression (27), P denotes the transmission power of the wireless apparatus 10b, $\sigma'^2$ denotes the noise power of the terminal 20, and $I_L$ denotes the L×L-dimensional unit matrix. Since the wireless apparatus 10b cannot grasp the noise power of the terminal 20, an appropriate value assumed by the wireless apparatus 10b is used as the value of $\sigma'^2$. The individual column vectors in W generated by expression (26) or (27) may be normalized to a magnitude of 1.

As described above, according to the third exemplary embodiment, orthogonalization processing is performed on the converted channel responses, and the weights are generated by using the orthogonalized channel response. Thus, the gain of the beamforming can be improved, and the throughput can be improved.

Fourth Exemplary Embodiment

According to a fourth exemplary embodiment, the order of the channel response conversion processing and the orthogonalization processing according to the third exemplary embodiment is changed. Namely, after the channel response per beam is orthogonalized, the channel response is converted into the channel response per antenna.

Figure 10:
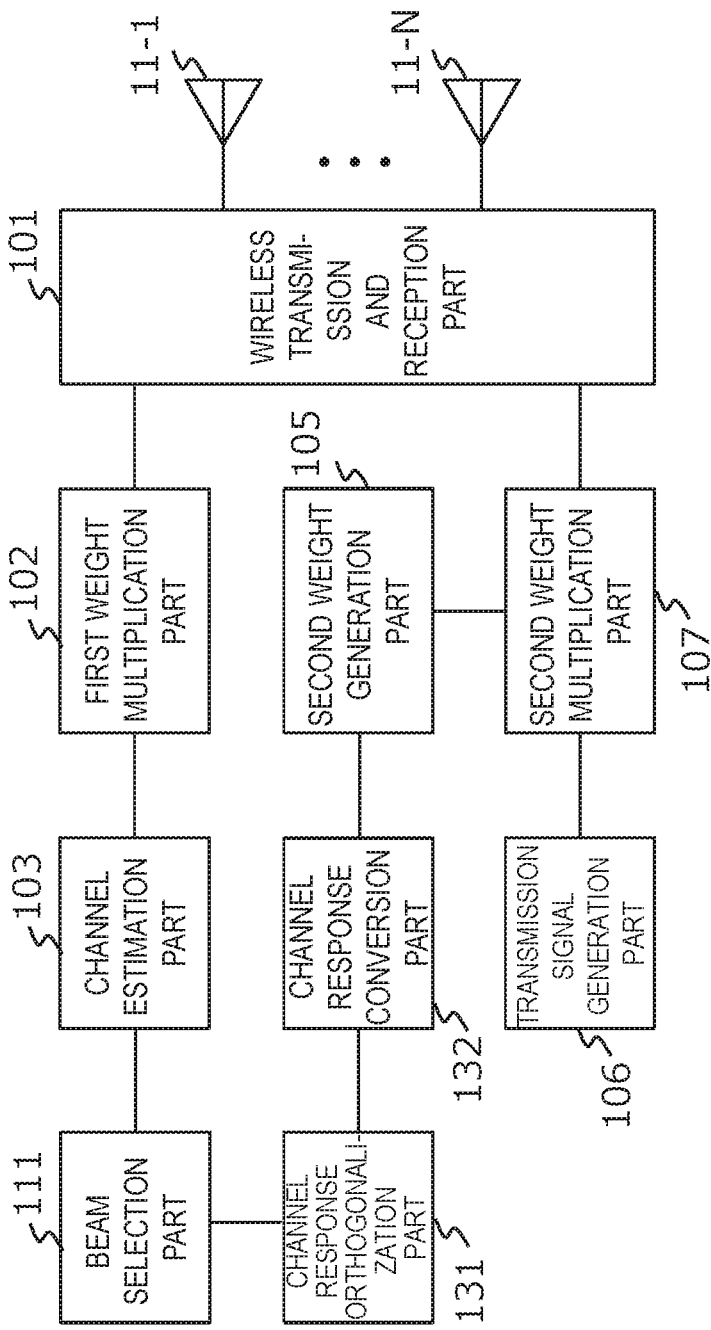
FIG. 10 an example of an internal configuration of a wireless signal transmission and reception circuit included in a wireless apparatus according to a fourth exemplary embodiment.

FIG. 10 illustrates an example of an internal configuration of a wireless signal transmission and reception circuit 14c included in a wireless apparatus 10c according to the fourth exemplary embodiment. As illustrated in FIG. 10, the order of the processing by the channel response orthogonalization part and the processing by the channel response conversion part in the wireless signal transmission and reception circuit 14*c* according to the fourth exemplary embodiment is different from the order performed by the equivalent circuit according to the third exemplary embodiment. Since other configurations are the same as those according to the third exemplary embodiment, description thereof will be omitted.

Figure 11:
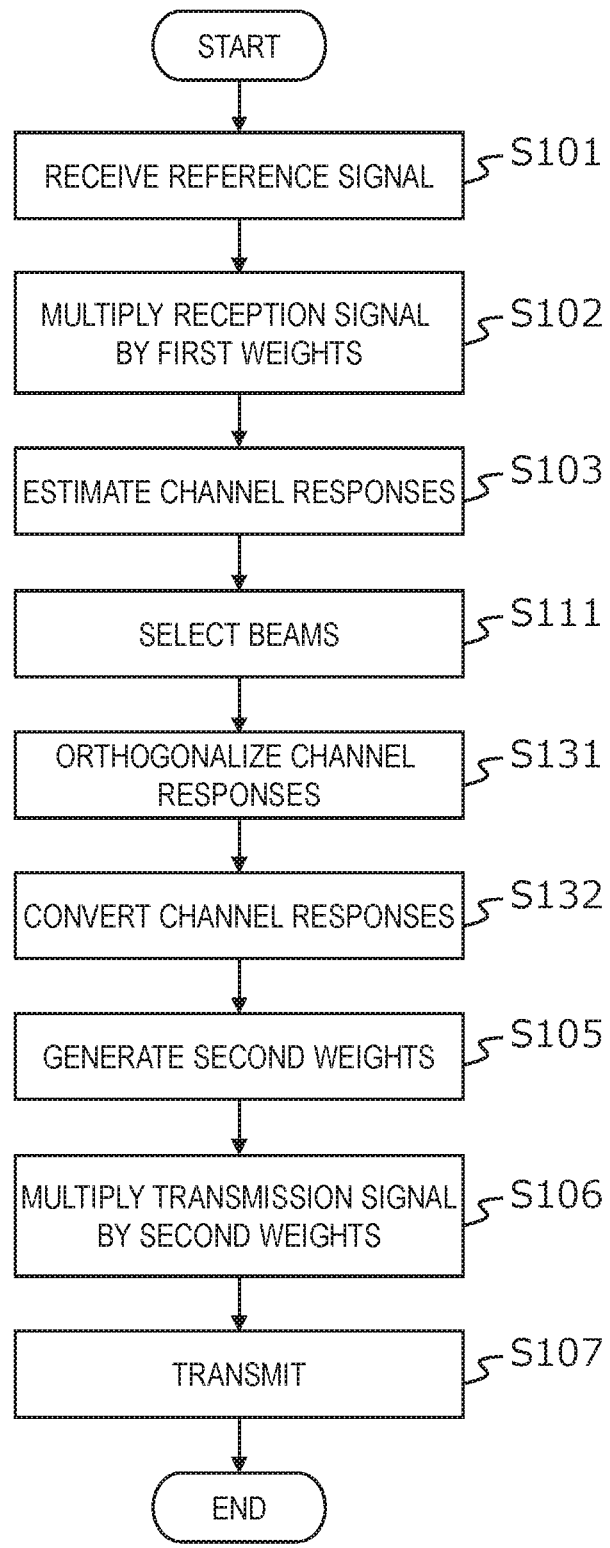
FIG. 11 is a flowchart illustrating an example of an operation of the wireless apparatus according to the fourth exemplary embodiment.

FIG. 11 is a flowchart illustrating an example of an operation of the wireless apparatus 10*c* according to the fourth exemplary embodiment. As illustrated in FIG. 11, unlike the wireless apparatus 10*b* according to the third exemplary embodiment, the wireless apparatus 10*c* according to the fourth exemplary embodiment orthogonalizes the channel responses first (step S131), and converts the channel responses next (step S132). Since other operations are the same as those according to the third exemplary embodiment, description thereof will be omitted.

Next, an example of the processing performed by the channel response orthogonalization part 131 according to the fourth exemplary embodiment will be described.

First, the channel response orthogonalization part 131 generates a group of beams selected per terminal 20, based on information about a beam selected for an individual one of the antennas 21 of an individual terminal 20 acquired from the beam selection part 111. A group $C_k$ of beams selected for the kth terminal can be expressed by the following expression (28) using a group $C_{k,m}$ of beams selected for the m-th antenna of the kth terminal.

$$C_k = \bigcup_{m=1}^{M} C_{k,m} \quad (28)$$

The following description assumes that $B_k$ denotes the number of elements of the group $C_k$ and $C_k(i)$ denotes the i-th element (i=1 to $B_k$) of the group $C_k$. Namely, when the i-th element of $C_k$ is the b-th beam, the b-th beam can be expressed by the following expression (29).

$$b = C_k(i) \quad (29)$$

Next, the channel response orthogonalization part 131 generates a matrix having, as the elements, the channel responses of the beams selected for an individual terminal 20. Since the beam selection part 111 selects a beam per antenna 21 of the terminal 20, there are cases in which the same beam is not selected between antennas of the same terminal 20. In this case, the channel response orthogonalization part 131 substitutes 0 in the channel response of a beam not selected.

An M×Bk-dimensional matrix $Q_k$ of the kth terminal having the channel responses of the selected beams as the elements can be expressed by the following expressions (30) and (31).

$$Q_k = \begin{pmatrix} q'_{k,1,1} & \cdots & q'_{k,1,B_k} \\ \vdots & \ddots & \vdots \\ q'_{k,M,1} & \cdots & q'_{k,M,B_k} \end{pmatrix} \quad (30)$$

$$q'_{k,m,i} = \begin{cases} q_{k,m,C_k(i)} & \text{if } C_k(i) \in C_{k,m} \\ 0 & \text{otherwise} \end{cases} \quad (31)$$

The channel response orthogonalization part 131 orthogonalizes the matrix having the channel responses of the selected beams as the elements. If singular value decomposition is used as the orthogonalization method, the M×$B_k$-dimensional matrix $Q_k$ of the kth terminal can be expressed by the following expression (32).

$$Q_k = U'_k E'_k V'^H_k \quad (32)$$

In expression (32), $U'_k$ denotes an M×M-dimensional matrix having left-singular vectors as the individual column vectors, $\Sigma'_k$ denotes an M×$B_k$-dimensional matrix having singular values as the diagonal components and 0 as the non-diagonal components, and $V'_k$ denotes a $B_k$×$B_k$-dimensional matrix having right-singular vectors as the individual column vectors.

If eigenvalue decomposition is used as the orthogonalization method, a product of the Hermitian transpose of $Q_k$ and $Q_k$ can be expressed by the following expression (33).

$$Q_k^H Q_k = V'_k \Lambda'_k V'^H_k \quad (33)$$

In expression (33), $\Lambda'_k$ denotes a $B_k$×$B_k$-dimensional matrix having eigenvalues as the diagonal components and 0 as the non-diagonal components and $V'_k$ denotes a $B_k$×$B_k$-dimensional matrix having eigenvectors as the individual column vectors. $V'_k$ in the expression (33) is equivalent to $V'_k$ in expression (32). In addition, the square root of an eigenvalue in expression (33) is equivalent to a singular value in expression (32). In addition, an individual matrix on which the orthogonalization processing is performed may be averaged in the time direction and in the frequency direction prior to the orthogonalization processing.

If singular value decomposition is used as the orthogonalization method, the channel response orthogonalization part 131 gives the singular values and the right-singular vectors to the channel response conversion part 132. If eigenvalue decomposition is used, the channel response orthogonalization part 131 gives the eigenvalues and the eigenvectors to the channel response conversion part 132. The smaller one of the number M of combinations of singular values and right-singular vectors or eigenvalues and eigenvectors in descending order of singular value or eigenvalue and the number of beams selected can be selected and given to the channel response conversion part 132.

Next, an example of the processing performed by the channel response conversion part 132 according to the fourth exemplary embodiment will be described.

The channel response conversion part 132 converts, regarding an individual terminal 20, the right-singular vectors or the eigenvectors acquired from the channel response orthogonalization part 131 into the channel response per antenna 11 by using the first weights. This example assumes that M eigenvalues and M eigenvectors are inputted from the channel response orthogonalization part 131.

A $B_k$×M-dimensional matrix $V''_k$ having M eigenvectors of the kth terminal as the individual column vectors is converted into an N×M-dimensional matrix $E_k$ by the following expressions (34) and (35) using an N×$B_k$-dimensional matrix $A_k$ having the first weights of the selected beams as the individual column vectors.

$$E_k = A_k * V''_k \quad (34)$$

$$A_k = (a_{C_k(1)} \cdots a_{C_k(B_k)}) \quad (35)$$

If the correlation of column vectors of $A_k$ is not 0, the magnitude of the individual column vectors of $E_k$ is not 1. In this case, the individual column vectors of $E_k$ can be normalized, and the square of a coefficient multiplied for normalization can be multiplied by the eigenvalues corresponding to the column vectors. However, when singular values, not eigenvalues, have been acquired from the channel response orthogonalization part 131, the singular values can be multiplied by a coefficient used for normalization.

The channel response conversion part 132 outputs the individual column vectors of $E_k$ calculated and the singular values or the eigenvalues acquired from the channel response orthogonalization part 131 to the second weight generation part 105.

As described above, according to the fourth exemplary embodiment, after the channel response per beam is orthogonalized, the channel response is converted into the channel response per antenna. Thus, the size of the matrix on which the orthogonalization processing is performed can be made smaller than the number of antennas, and the calculation amount needed for the orthogonalization processing can be reduced.

The first to fourth exemplary embodiments have been described as examples, not to limit the system configurations or operations. For example, while the above exemplary embodiments have been described by using downlink communication (transmission by the wireless apparatus 10) as an example, the wireless communication method is also applicable to uplink communication (reception by the wireless apparatus 10).

In addition, in the above exemplary embodiments, while the processing modules illustrated in FIG. 4, etc. are realized by the wireless signal transmission and reception circuit 14, the processing modules illustrated in FIG. 4, etc. may be realized entirely or partially by the CPU 12. Alternatively, the processing modules may be realized entirely or partially by a circuit different from the CPU 12 and the wireless signal transmission and reception circuit 14. Namely, the above exemplary embodiments are applicable, as long as the functions of the above processing modules are realized by some hardware or software executed by using some hardware. If the above processing modules are realized by the CPU 12, the processing modules are realized by causing the CPU 12 to execute a program stored in the memory 13, for example. In addition, this program can be updated by downloading via a network or by using a storage medium in which a program is stored.

In the above exemplary embodiments, while cases in which digital beamforming is realized by digital signal processing, the beamforming may be realized by a different method other than the digital signal processing. The individual processing described above may be realized by analog signal processing. Namely, the disclosure of the present application is also applicable to analog beamforming.

The above exemplary embodiments can partially or entirely be described, but not limited to, as follows.

[Mode 1]
See the wireless apparatus according to the above first aspect.

[Mode 2]
The wireless apparatus according to mode 1; wherein the first weights of two arbitrary beams of the plurality of beams are orthogonal to each other.

[Mode 3]
The wireless apparatus according to mode 2; wherein the first weights are discrete Fourier transform (DFT) matrixes.

[Mode 4]
The wireless apparatus according to mode 2;
wherein the first weight multiplication part is connected to an antenna(s) having a planar array configuration in which antenna elements are arranged in a horizontal direction and a vertical direction; and wherein an individual one of the first weights is a Kronecker product of a discrete Fourier transform (DFT) matrix in the horizontal direction and a DFT matrix in the vertical direction.

[Mode 5]
The wireless apparatus according to any one of modes 1 to 4; wherein the channel response conversion part converts the first channel responses into the second channel responses by synthesizing products of the first weights and the first channel responses for the respective beams.

[Mode 6]
The wireless apparatus according to any one of modes 1 to 5, further including a beam selection part that selects a beam(s) used by the channel response conversion part from the plurality of beams by using the first channel responses.

[Mode 7]
The wireless apparatus according to mode 6; wherein the beam selection part selects a beam(s) used by the channel response conversion part from the plurality of beams by using power of the reference signal(s) and noise power of the wireless apparatus.

[Mode 8]
The wireless apparatus according to any one of modes 1 to 7, further including a channel orthogonalization part that performs orthogonalization processing on the second channel responses;
wherein the second weight generation part generates the second weights by using the second channel responses on which the orthogonalization processing has been performed.

[Mode 9]
The wireless apparatus according to any one of modes 1 to 7, further including a channel orthogonalization part that performs orthogonalization processing on the first channel responses;
wherein the channel response conversion part converts the first channel responses on which the orthogonalization processing has been performed into the second channel responses.

[Mode 10]
The wireless apparatus according to any one of modes 1 to 9; wherein the channel response conversion part converts the first channel responses estimated by the channel estimation part into the second channel responses, each of which is for an individual antenna, by using the first weights.

[Mode 11]
The wireless apparatus according to any one of modes 1 to 10; wherein the channel estimation part estimates a first channel response for an individual one of the plurality of beams by using the signals obtained by the multiplication by the first weights and the reference signal(s).

[Mode 12]
See the wireless communication method according to the above second aspect.

[Mode 13]
A program, causing a computer to perform processing for:
receiving a signal(s) including a reference signal(s) transmitted from a wireless terminal(s);
multiplying the wireless signal(s) by first weights, each of which corresponds to an individual one of a plurality of beams;
estimating first channel responses for the respective beams by using the wireless signals obtained by the multiplication by the first weights;
converting the first channel responses into second channel responses by using the first weights; and generating second weights used for wireless communication with the wireless terminal(s) by using the second channel responses.

This program can be recorded in a computer-readable storage medium. As this storage medium, a non-transient storage medium such as a semiconductor memory, a hard disk, a magnet recording medium, or an optical recording medium may be used. The present invention can be embodied as a computer program product.

[Mode 14]

A wireless communication system, including:
a wireless terminal(s); and
a wireless apparatus that performs wireless communication with the wireless terminal(s);
wherein the wireless apparatus includes:
an antenna(s) that receives a signal(s) including a reference signal(s) transmitted from the wireless terminal(s);
a first weight multiplication part that multiplies the wireless signal(s) by first weights, each of which corresponds to an individual one of a plurality of beams;
a channel estimation part that estimates first channel responses for the respective beams by using the wireless signals obtained by the multiplication by the first weights;
a channel response conversion part that converts the first channel responses into second channel responses by using the first weights; and
a second weight generation part that generates second weights used for wireless communication with the wireless terminal(s) by using the second channel responses.

Modes 13 and 14 can be expanded in the same way as mode 1 is expanded into modes 2 to 11.

The disclosure of each of the above PTLs, etc. is incorporated herein by reference thereto. Variations and adjustments of the exemplary embodiments and examples are possible within the scope of the overall disclosure (including the claims) of the present invention and based on the basic technical concept of the present invention. Various combinations and selections (including partial eliminations) of various disclosed elements (including the elements in the claims, exemplary embodiments, examples, drawings, etc.) are possible within the scope of the disclosure of the present invention. Namely, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed.

REFERENCE SIGNS LIST 10, 10a to 10c, 30 wireless apparatus
11, 11-1 to 11-N, 21, 21-1 to 21-M antenna
12 CPU (Central Processing Unit)
13 memory
14, 14a to 14c wireless signal transmission and reception circuit
15 NIC (Network Interface Card)
20, 20-1 to 20-K terminal
31, 102 first weight multiplication part
32, 103 channel estimation part
33, 104, 132 channel response conversion part
34, 105 second weight generation part
101 wireless transmission and reception part
106 transmission signal generation part
107 second weight multiplication part
111 beam selection part
121, 131 channel response orthogonalization part

What is claimed is:

1. A wireless apparatus, comprising:
a first weight multiplication part that includes first weights, each of which corresponds to an individual one of a plurality of beams, and multiplies a signal(s) corresponding to a reference signal(s) transmitted from a wireless terminal(s) by the first weights;
a channel estimation part that estimates first channel responses for the respective beams by using the signals obtained by the multiplication by the first weights;
a channel response conversion part that converts the first channel responses into second channel responses by using the first weights; and
a second weight generation part that generates second weights used for wireless communication with the wireless terminal(s) by using the second channel responses.

2. The wireless apparatus according to claim 1; wherein the first weights of two arbitrary beams of the plurality of beams are orthogonal to each other.

3. The wireless apparatus according to claim 2; wherein the first weights are discrete Fourier transform (DFT) matrixes.

4. The wireless apparatus according to claim 2;
wherein the first weight multiplication part is connected to an antenna(s) having a planar array configuration in which antenna elements are arranged in a horizontal direction and a vertical direction; and
wherein an individual one of the first weights is a Kronecker product of a discrete Fourier transform (DFT) matrix in the horizontal direction and a DFT matrix in the vertical direction.

5. The wireless apparatus according to claim 1; wherein the channel response conversion part converts the first channel responses into the second channel responses by synthesizing products of the first weights and the first channel responses for the respective beams.

6. The wireless apparatus according to claim 1, further comprising a beam selection part that selects a beam(s) used by the channel response conversion part from the plurality of beams by using the first channel responses.

7. The wireless apparatus according to claim 6; wherein the beam selection part selects a beam(s) used by the channel response conversion part from the plurality of beams by using power of the reference signal(s) and noise power of the wireless apparatus.

8. The wireless apparatus according to claim 1, further comprising a channel orthogonalization part that performs orthogonalization processing on the second channel responses;
wherein the second weight generation part generates the second weights by using the second channel responses on which the orthogonalization processing has been performed.

9. The wireless apparatus according to claim 1, further comprising a channel orthogonalization part that performs orthogonalization processing on the first channel responses;
wherein the channel response conversion part converts the first channel responses on which the orthogonalization processing has been performed into the second channel responses.

10. The wireless apparatus according to claim 1: wherein the channel response conversion part converts the first channel responses estimated by the channel estimation part into the second channel responses, each of which is for an individual antenna, by using the first weights.

11. The wireless apparatus according to claim 1; wherein the channel estimation part estimates a first channel response for an individual one of the plurality of beams by using the signals obtained by the multiplication by the first weights and the reference signal(s).

12. A wireless communication method, comprising:
multiplying a signal(s) including a reference signal(s) transmitted from a wireless terminal(s) by first weights, each of which corresponds to an individual one of a plurality of beams;
estimating first channel responses for the respective beams by using the signals obtained by the multiplication by the first weights;
converting the first channel responses into second channel responses by using the first weights; and
generating second weights used for wireless communication with the wireless terminal(s) by using the second channel responses.

13. The wireless communication method according to claim 12;
wherein the first weights of two arbitrary beams of the plurality of beams are orthogonal to each other.

14. The wireless communication method according to claim 13;
wherein the first weights are discrete Fourier transform (DFT) matrixes.

15. The wireless communication method according to claim 13;
wherein the first weight multiplication part is connected to an antenna(s) having a planar array configuration in which antenna elements are arranged in a horizontal direction and a vertical direction; and
wherein an individual one of the first weights is a Kronecker product of a discrete Fourier transform (DFT) matrix in the horizontal direction and a DFT matrix in the vertical direction.

16. The wireless communication method according to claim 12, comprising;
converting the first channel responses into the second channel responses by synthesizing products of the first weights and the first channel responses for the respective beams.

17. A wireless communication system, comprising:
a wireless terminal(s); and
a wireless apparatus that performs wireless communication with the wireless terminal(s);
wherein the wireless apparatus includes:
an antenna(s) that receives a signal(s) including a reference signal(s) transmitted from the wireless terminal(s);
a first weight multiplication part that multiplies the signal(s) by first weights, each of which corresponds to an individual one of a plurality of beams;
a channel estimation part that estimates first channel responses for the respective beams by using the wireless signals obtained by the multiplication by the first weights;
a channel response conversion part that converts the first channel responses into second channel responses by using the first weights; and
a second weight generation part that generates second weights used for wireless communication with the wireless terminals) by using the second channel responses.

18. The wireless communication system according to claim 17;
wherein the first weights of two arbitrary beams of the plurality of beams are orthogonal to each other.

19. The wireless communication system according to claim 18;
wherein the first weights are discrete Fourier transform (DFT) matrixes.

20. The wireless communication system according to claim 18;
wherein the first weight multiplication part is connected to an antenna(s) having a planar array configuration in which antenna elements are arranged in a horizontal direction and a vertical direction; and
wherein an individual one of the first weights is a Kronecker product of a discrete Fourier transform (DFT) matrix in the horizontal direction and a DFT matrix in the vertical direction.

* * * * *